United States Patent [19]

Tranquilla

[11] Patent Number: 4,986,490

[45] Date of Patent: Jan. 22, 1991

[54] FILM SUPPLY AND THREADING MECHANISM

[75] Inventor: Michael N. Tranquilla, Livonia, Mich.

[73] Assignee: Unisys Corp., Detroit, Mich.

[21] Appl. No.: 298,704

[22] Filed: Jan. 19, 1989

[51] Int. Cl.$^5$ ............................ G03B 1/04; G03B 1/18; G03B 1/56

[52] U.S. Cl. ..................................... 242/179; 242/198

[58] Field of Search ............... 242/179, 180, 181, 190, 242/198, 199, 200, 71.2; 354/212–216; 352/180, 182

[56] References Cited

U.S. PATENT DOCUMENTS

| | | |
|---|---|---|
| 3,209,644 | 10/1965 | Simmon et al. |
| 3,478,985 | 11/1969 | Tobey |
| 4,037,239 | 7/1977 | Jamieson et al. |
| 4,058,266 | 11/1977 | Beery |
| 4,087,173 | 5/1978 | Beery |
| 4,093,151 | 6/1978 | Karsh ................................... 242/198 |
| 4,175,719 | 11/1979 | Speckman et al. |

Primary Examiner—John M. Jillions
Attorney, Agent, or Firm—Nathan Cass; Mark T. Starr

[57] ABSTRACT

An improved photographic film supply and threading mechanism which enables a person to prepare a document record camera 44,45 for use without having to feed the film 36 through a complex system of guides and rollers 38, 42 within the body of the camera where the lens and shutter system are exposed to possible displacement and damage. The film 36 is simply fed around a pattern of rollers 38, 42 from a supply reel 22 to a take-up reel 26 mounted on a suitable support assembly 10,14. The assembly is then placed into the body of the camera 44,45 where a combination of film tension arms 59,71 and associated motor control switches act 60,72 together to position the film 36 along a path crossing the image plane 44 of the camera where when the assembly is in position as sensed by a switch 74 it may be exposed as the camera control circuit FIG. 4 advances the film.

13 Claims, 3 Drawing Sheets

FILM SUPPLY AND THREADING MECHANISM

BACKGROUND OF THE INVENTION

1. Field of the Invention

The invention relates to a photographic film supply and threading assembly for use in a high speed camera.

2. Description of the Prior Art

In the past it has been common practice to use open reels of film in high speed microfilm cameras used to photograph financial documents. In order to install the film in the camera, a supply reel would be mounted on a suitable spindle. A portion of the film would then be unwound from the supply reel and be carefully fed through a system of film advance rollers and idler rolls and over a capstan followed by more rollers before being attached to a suitable take-up reel. This was a very time-consuming and intricate task since it had to be done within the confines of the camera body. Great care had to be exercised in positioning the film so that it would feed properly at high speed and not jam or come off any of the pulleys or rollers in the feed path. Also, care had to be taken to not move or damage any portion of the lens system of the camera.

The film transport assembly of the present invention allows the supply reel of film to be put in place and the film to be fed around spaced guide rollers to the take-up reel while the assembly is outside of the camera body. After loading, the film transport assembly can be put into position in the camera where the film is brought to the image plane and automatically tensioned and prepared for movement in the camera without the film having to be handled again by the operator.

The field in which the present invention is expected to be employed, that of high speed microfilming of documents as in a check processing environment, will benefit by enhanced speed of film movement and greater simplicity of film loading and unloading. In this area, representative of prior art relating to film transport motor controls, in the applicant's opinion is the U.S. Pat. No. 4,058,266, granted Nov. 15, 1977 to Jack Beery. Jack Beery is also the inventor of U.S. Pat. No. 4,087,173 granted May 2, 1978, relating to a document photography system which has been incorporated in earlier devices sold by Unisys Corporation and its predecessors. Other patents of interest might include U.S. Pat. No. 4,175,719 granted Nov. 27, 1979 to Speckman (illustrating a cartridge which may be used in connection with the present invention); U.S. Pat. No. 3,209,644 granted Oct. 5, 1965 to Simmon et al relating to reeling and unreeling of a different device; and U.S. Pat. No. 3,478,985 granted Nov. 18, 1969 to Richard Tobey relating to a still different tape transport. A less desirable device is illustrated by U.S. Pat. No. 4,037,239 of July 19, 1977 to Jamieson et al. The invention of this application represents a novel and significant improvement in light of such prior devices.

SUMMARY OF THE INVENTION

The present invention is an improved system for loading and moving film in a high speed camera. The system includes a support base which is separable from the camera and upon which can be mounted supply and take-up reels for the film. Each reel has an associated drive motor which is mounted on the support base or which may be mounted in the camera and which may be suitably brought into operating contact with the reels when the support base is inserted into the camera. Between the supply and take-up reels are mounted film guide rollers which define a first film path. Also mounted on the support base is a motor driven capstan drive roller which is not in the first film path.

It is a feature of the present invention that separate reels or cartridge held reels can quickly be mounted by placing the stretched film between reels over rollers which will subsequently define film movement and then move the film on the support base to enable engagement with the activating capstan rollers and film tension control mechanisms.

Within the body of the camera is the image plane of the lens system at which point the image is focused onto the film. Disposed on either side of the image plane are a pair of pivoted spring biased control arms which have a film roller mounted at one end and a switch contacting surface at the opposite end. A control switch for controlling the electrical power to the supply and take-up reel motors is positioned to be activated by the surface on the control arms.

After the supply reel of film is mounted on its support and the film led about the film rollers to a take-up reel, the base assembly is ready to be mounted in the camera. The loading of the film along the first film Path can be done outside of the camera with very little skill. The film does not have to be threaded through a complex of rollers and around idler rollers or spring loaded arms within the body of a camera as is the usual practice. The support base is then placed into the camera and advanced toward the image plane. The rollers on the spring biased control arms contact the film. As the assembly continues to move forward, the control arms are moved causing the switch contact portion to activate the motor control switches When the motors are energized during the film loading process both motors turn to release film from the supply and take-up reels. When sufficient film is released, the switch activating surfaces at the ends of the film tension arms move off of the switches, turning off the power to the motors. The film is now held under tension by the springs that bias the control arms. The control arms and associated film rollers hold the film in a second film path where the film is wrapped about a major portion of the surface of the capstan roller. The film is now ready to be advanced through the camera under control of the capstan roller with the tensioning arms performing the usual function as inertia buffers during high speed incremental film advance. The tensioning arms and associated elements are made of lightweight materials to enable the tensioning arms to act as low inertia elements to enable the film to be moved from one frame to the next in three milliseconds as is required for processing film for capture of documents in a high speed check and document processing environment. The film is exposed for 40 milliseconds and in that interval the control arms recycle as will be described in the detailed description. During the 40 millisecond and 3 millisecond time intervals, the control switches and reversible DC motors act in concert to enable at low cost and effectively the substantially instantaneous film advance when required without breaking the film, in the embodiment described herein as the most preferred embodiment.

It should again be noted that the film has been threaded into position in the camera without having to be fed through rollers or wrapping on the capstan. The mere movement of the film supply assembly into position completed the final steps necessary to prepare the camera for operation. All of the film loading steps have been easily performed outside of the camera with plenty of space to work and without danger of damaging the lens system of the camera.

The invention, both as to its organization and method of operation, together with further advantages thereof, will best be understood by reference to the following Detailed Description of the Invention taken in connection with the accompanying drawings.

DESCRIPTION OF THE INVENTION

Figure 1:
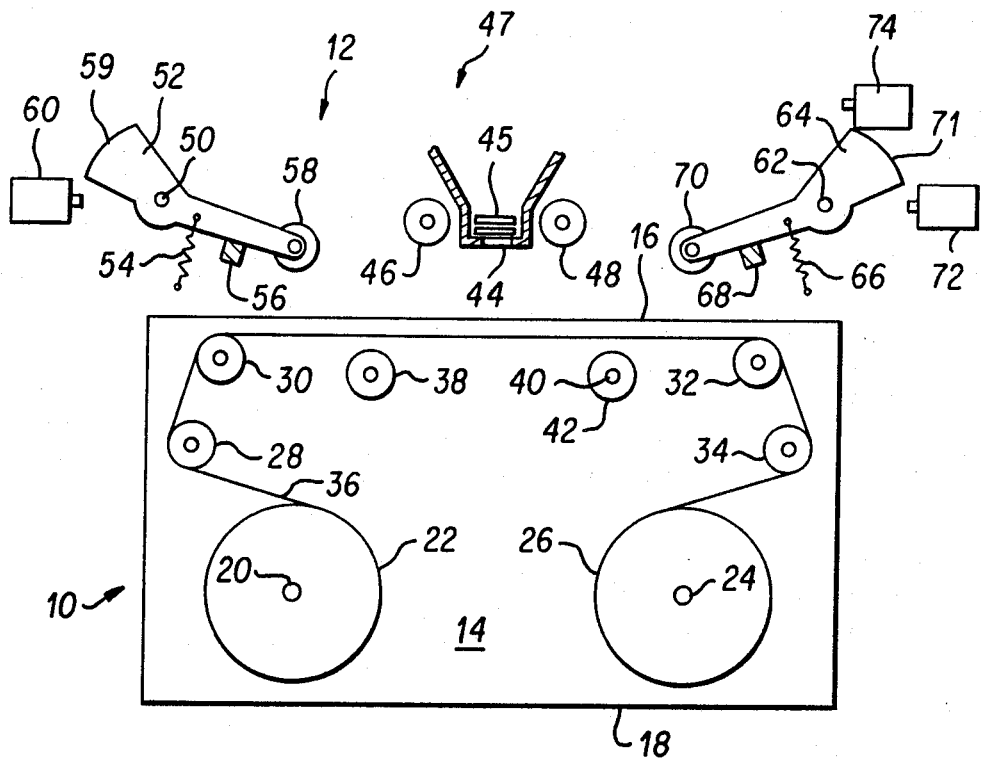
FIG. 1 is a schematic view of the elements of the film transport assembly before the support base and film are loaded into the camera.

Referring to FIG. 1, the film transport assembly is made up of two major subassemblies. The first part is the film supply assembly indicated generally by the number 10 and the second is the film control assembly indicated generally by the number 12.

The film supply assembly 10 has a support or base plate 14 upon which the several parts of the film supply assembly are mounted. The support plate 14 can be made of metal such as a steel or aluminum alloy. It can also be made of any of the well known sheet plastic materials of sufficient strength and rigidity to support the several components.

The support plate 14 has a leading edge 16 and a trailing edge 18. Adjacent to the trailing edge and near the left corner as shown in FIG. 1 is mounted a rotatable shaft or carrier 20 for supporting film supply reel 22. The shaft 20 is driven by a suitable electric motor, not shown. The motor is preferably driven by direct current or D.C. power so that its direction of rotation can be reversed. An alternating current or A.C. motor can also be used, if it is adapted to drive the shaft 20 in either direction.

Near the right rear corner, as shown in FIG. 1, is mounted a second rotatable shaft or carrier 24 for supporting a film take-up reel 26. The shaft 24 is driven by a suitable electric motor, not shown.

The motor is preferably driven by direct current or D.C. so that its direction of rotation can easily be reversed. An alternating current or A.C. motor can also be used if it is adapted to rotate the shaft 24 in either direction.

On the top surface of the support base 14 near the left front corner are mounted a pair of film transfer rollers 28 and 30. A similar pair of transfer rollers 32 and 34 are mounted near the right front corner of the support plate. Each of the film transfer rollers are substantially identical having a rubber or elastomer covering to control the vertical movement of the film. The diameter of the rollers is not critical. It is preferred that they be of sufficient width so that the film will bend at a wide angle to avoid sharp bends in the film with resultant possible breakage.

The photographic film 36 is fed from the supply reel 22 about the film transfer rollers 28, 30, 32 and 34 to the film take-up reel 26. The film is easily loaded into what is referred to herein as the first film path while the film supply assembly is outside of the body of the camera. The film can be loaded either in a darkened room or in a suitable glove box by merely placing the film s supply on its support spindle and then unwinding sufficient film to follow the path about the film transport rollers to the take-up reel.

A film transport roller 38 is mounted on the top of the support plate to the left of center near the forward edge and adjacent to the first film path. A capstan drive shaft 40 carrying a capstan or film advance roller 42 is mounted on the support plate to the right of center and spaced from the film transport roller 38 along a line parallel to the leading edge of the support plate. Both the film transport roller 38 and the capstan 42 are located within the area bounded by the first film path. The capstan drive shaft 40 is driven by a suitable motor, not shown, which is attached to the bottom of the support plate. The motor is preferably of the stepping type for moving the film in incremental steps.

The motors to drive the reels and the capstan may also be mounted in the camera with drive connection established by suitable spindles in the support plate engaging shafts on the motors.

After the film supply assembly is loaded with photographic film, it is placed into the body of the camera to bring the film into contact with the image plane 44. At the image plane there is a shutter 45 which is open at all times during the movement of film across the image plane. When the shutter is open, it may expose a slit opening behind which a rotating mirror may reflect the image from the document to be copied onto the film moving across the image plane.

Since FIGS. 1, 2, 2A, 3 and 3A are schematic views, only those components which form part of the present invention are illustrated. The remaining portions of the camera generally indicated by 47 are well known and conventional and form no part of the present invention.

Within the camera body a pair of film transport rollers 46 and 48 similar to those earlier described, are mounted along the direction of film travel on either side of the image plane 44. These rollers assist in flattening the film and in providing a smooth passage for the film across the image plane of the camera.

To the left of the image plane 44, as seen in FIG. 1, is pivot shaft 50 upon which is mounted a film tension and control arm 52. The control arm 52 is biased by spring 54 against a stop 56 where it is held when no film is in the camera. At the end of the film tension and control arm 52 closest to the image plane of the camera is mounted a film transfer roller 58 which is adapted to contact and roll along the surface of the film as it moves through the camera. The end 59 of the control arm remote from the film transfer roll is used to actuate a control switch 60 which is used to control the electrical power to the motor that drives the film supply reel 22.

To the right of the image plane 44, there is mounted a second pivot shaft 62. The pivots 50 and 62 are preferably equidistant from the image plane and disposed at either end of an imaginary line behind and parallel to the image plane. The pivot 62 is used to support a film tension and control arm 64 which is substantially identical to the arm 52. The control arm 64 is biased by a spring 66 against a stop 68 where it is held when no film is in the camera. At the end of the film tension and control arm 64 closest to the image plane of the camera is mounted a film transfer roller 70 which is adapted to contact and roll along the film as it moves through the camera. The end 71 of the control arm remote from the film transfer roll is used to activate a control switch 72 which is used to control the electrical power to the motor that drives the film take-up reel 26.

A switch 74 is shown schematically in FIGS. 1, 2, 2A, 3 and 3A. This switch is a part of the control circuit and is used to detect the presence of the film supply assembly 10 in the camera body. The operation of the switch will be more fully described in relation to FIGS. 3 and 3A.

Figure 2:
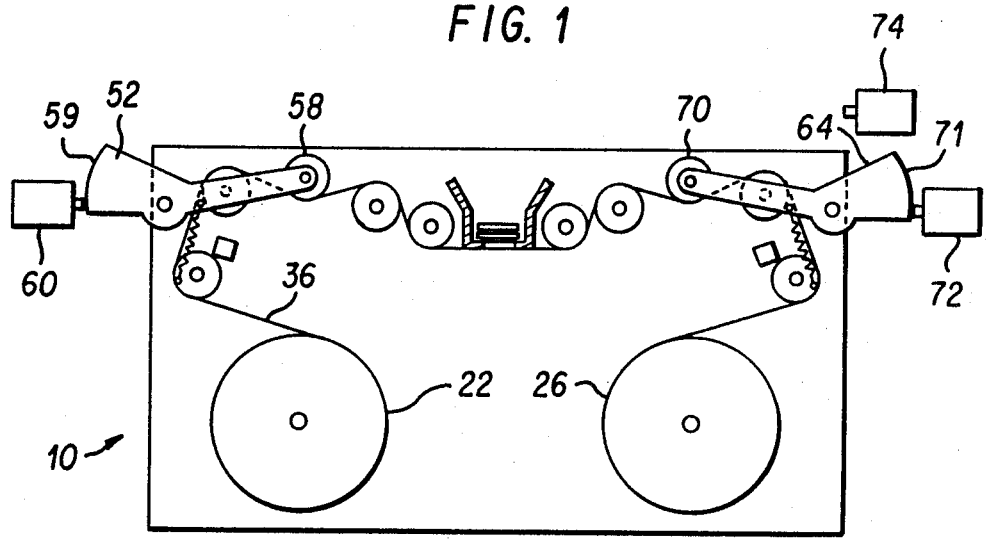
FIG. 2 is a schematic view of the elements of the film transport assembly as the support base and film are being loaded into the camera.

Referring to FIG. 2, the film supply assembly 10 is shown partially inserted into the film control assembly 12 within the camera body. The motors which drive film supply reel 22 and film take-up reel 26 do not appreciably rotate as pressure is applied against film 36. The rotation of the motors can be resisted by clutches, ratchets, gear boxes, etc., as is well known in the art. As the film supply assembly 10 is moved into the camera, the film 36 pushes against film transfer rollers and 58 and 70 at the ends of film tension and control arms 52 and 64, respectively. The pressure of the film causes arms 52 and 64 to pivot bringing the switch activating surfaces 59 and 71 at the ends of the arms into contact with switches 60 and 72, respectively. While pressure activated switches are shown, these could be replaced by optical switches with the switch contacting portion of the control arm functioning as a shutter to interrupt a beam of light thereby activating a switch or gating circuit. When switch 60 is activated, the film supply reel motor is caused to rotate in a counter-clockwise direction releasing film from the supply reel 22. When switch 72 is activated, the film take-up reel motor rotates in a clockwise direction releasing film from the reel 26.

Figure 2A:
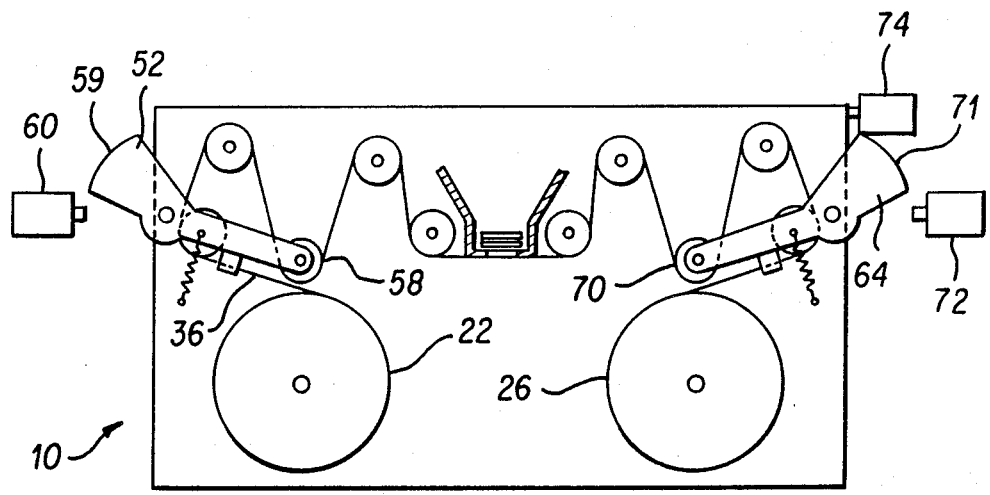
FIG. 2A is a schematic view of the elements of the film transport assembly after the support base and film have been fully loaded into the camera.

As the film supply assembly 10 continues to move into the camera, the above described process is continued until the condition illustrated in FIG. 2A is attained. At this point, the film supply is fully inserted. The switch support plate 14 is in contact with switch 74 but activating surfaces 59 and 71 on control arms 52 and 64 are not in contact with switches 60 and 72, respectively. The film 36 is also in contact with a substantial portion of the capstan roller 42 and the film transfer or idler roller 38. The film is now in the second film path and is ready to be moved across the image plane of the camera.

It is worth repeating again that the film does not have to be manipulated by the camera operator after the film supply 10 is loaded outside the camera. The film is placed in proper position at the image plane of the camera and is put under tension about the face of the capstan roller and is ready for controlled movement all by merely inserting the film supply 10 into the body of the camera. During the early portion of the movement of the base plate 14 into the camera, the film 36 causes the film tension arms to pivot about their respective supports bringing the switch contacting portion of each arm into contact with its associated switch or sensor. When the sensor 74 is not activated, the closing of switches 60 and 72 causes the corresponding drive motors for film reels 22 and 26 to rotate so as to release film from each reel. The process of releasing film from the reels continues as long as switches 60 and 72 are closed until the release of the film creates enough slack to allow the springs 54 and 66 to pull the arm sensors 52 and 64 so as to open switches 60 and 72 and stop the drive motors. This position is shown in FIG. 2A. The base plate 14 is then fully seated in the camera and the plate sensor switch 74 is closed.

From the above, it can be seen that if the plate sensor 74 is not activated and if switches 60 and 72 are not closed, the reel motors are off. On the other hand, if the plate sensor 74 is not activated but either arm sensor switch is activated, the corresponding reel motor is turned on so that film is fed from the reel. When the plate sensor 74 is closed and both arm sensor switches 60 and 72 are open, the film is correctly threaded around the rollers and the reel motors are turned off. The film is now ready to be moved by the capstan or drive roller 42.

When the camera control circuit advances film by means of the capstan 42, the reel motors are turned on and off by appropriate logic circuitry depending on the status of the film tension arms.

Figure 3:
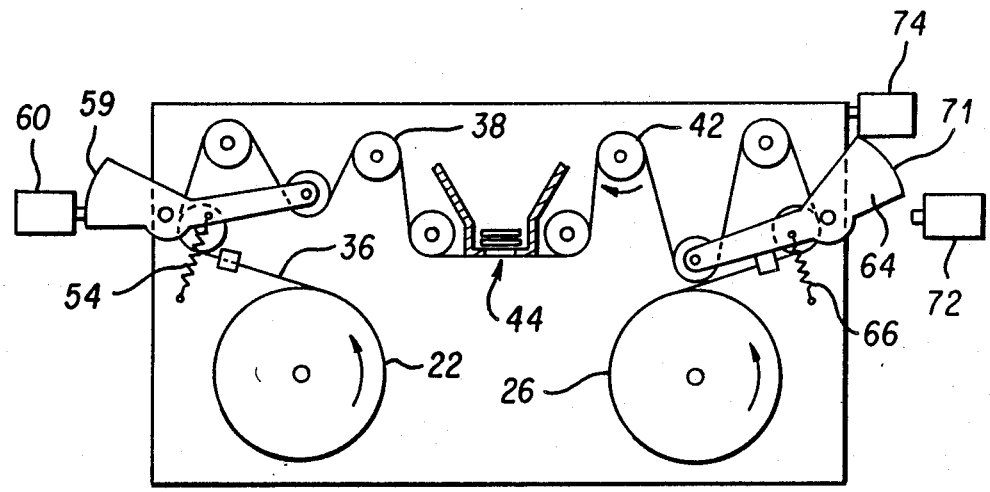
FIG. 3 is a schematic view of the elements of the film transport assembly with the film tensioned and moving in the camera from left to right as shown.

Referring to FIG. 3, if the capstan or drive roller 42 is driven in a clockwise direction to take up film from the loop buffered by arm 59, and to advance it past the image plane 44 (see FIG. 1) the reversible DC servo motor 24 (shown by shaft 24) driving take-up reel 26 is driven in a counter-clockwise direction while switch 72 is open. When switch 60 closes it cause motor 20 to turn counter-clockwise as described below. Also while switch 72 is open, the tension arm 64 and spring 66 act as an inertial buffer to control high speed film advance quickly creating a loop. The movement of the film by the clockwise motion of capstan 42 which is the direction of feed causes tension arm 52 to rotate counter-clockwise as the loop of film is taken up by the capstan, and the cam control surface 59 on arm 52 acts to close switch 60 which then activates the reversible DC servo motor 20 (shown by shaft 20) of supply reel 22 to turn it on a counterclockwise direction to release additional film.

Figure 3A:
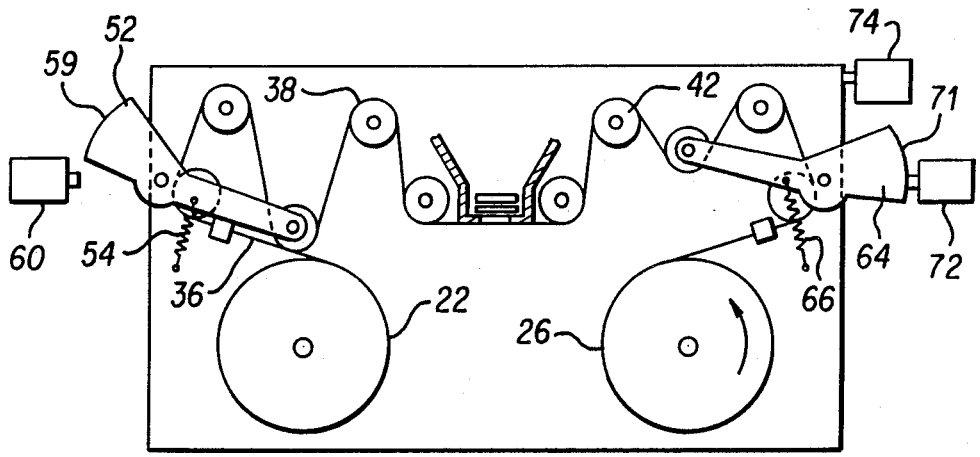
FIG. 3A is a schematic view of the elements of the film transport assembly at the instant when the film is not moving but is being exposed at the image plane.

FIG. 3A shows the result o: the motion of motor 20 moving counterclockwise (caused by opening of switch 60) and letting out film. This capstan movement opens switch 72, which caused motor 24 to turn counterclockwise to take up the loop which had been fed during the 3 millisecond film advance whenever switch 72 is closed as shown. This action may occur while the film at the image plane is stationary (approximately 40 milliseconds) during which time the capstan 42 is stopped, as shown in FIG. 3A, out this is not necessary. The motor can be breaked and dependent upon the size of the film reel switch 60 may be open or closed as dependent upon the amount of film in the loop. During the time the motor 24 moves counterclockwise it takes up film increasing the tension on the film and thus the action of the reversible motor 24 has caused tension arm 64 to rotate clockwise until switch 72 is closed. Then the cycle repeats itself with the clockwise rotation of capstan 42.

The preferred embodiment of the invention has been described with the use of the low inertia arms, biased to open the related switches by springs, 54, 66. These control switches and the reversible DC servo motors are part of the preferred embodiment, because the simple control switch, and the reversible motors allow control within the time frame of 3 milliseconds.

In an alternative embodiment, now shown, the control of the motors could be achieved with the use of optical encoders for each motor and the capstan, but this is a much more expensive embodiment.

Figure 4:
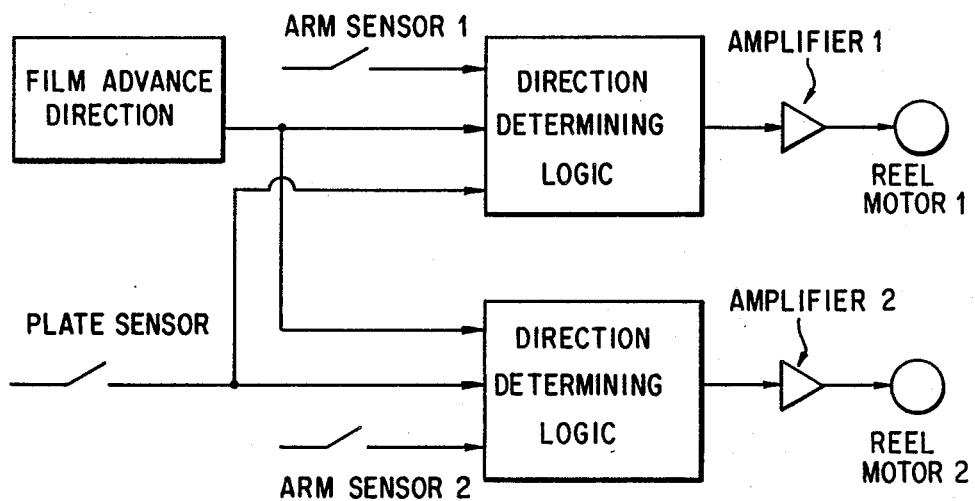
FIG. 4 represents a schematic of the central logic governing the motor controls during film movement.

FIG. 4 illustrates schematically the control circuit. As shown, the film advance direction is determined by film advance direction logic 83 which is related to the motion of the capstan. Inputs to direction determining logic 84, 85 are associated with the plate sensor 74 and the respective arm sensor control switches 60 and 72 respectively. The output of this direction determination logic is a servo motor control signal which is amplified by amplifiers 81 and 82 respectively to cause the reel motors and their associated shafts 20, 24 to rotate in the appropriate direction.

The logic for the motor control functions can be implemented using semiconductor devices or integrated circuits and may be implemented by servo motor drivers, such as those available from Compumotor Division of Parker Hannifin, or other similar suppliers, or made by those skilled in this art from available components.

Similarly, the wiring for the several motors and switches is not shown as this is also well within the skill of the art and would only serve to clutter the drawings used to illustrate the invention.

It is within the scope of the disclosure that the film cartridge can be either separate reels locked together with a snap fit with the film extending therebetween as illustrated by U.S. Pat. No. 4,175,719 previously cited which is preferred, or reels mounted in a integral housing made to match the spacing of the particular shaft and insertion film supply base plate in the form of a cartridge, which would be an acceptable alternative embodiment.

While a particular embodiment of the invention has been described, it will be understood that the invention is not limited thereto since modifications may be made. It is therefore contemplated by the appended claims to cover any such modifications as fall within the true spirit and scope of the invention.

What is claimed is:

1. A film loading and control system adapted to be mounted in a camera having an image plane comprising:
   a support means adapted to be mounted in the camera;
   a film supply carrier means disposed on said support means;
   a film take-up carrier means disposed on said support means;
   a plurality of film guide rollers disposed on said support means defining a first film path between said film supply carrier means and said film take-up carrier means before said support means is mounted in the camera;
   a film advance roller disposed on said support means for moving film between said supply carrier means and said take-up carrier means across the camera image plane;
   a film tension means disposed in the camera;
   a control means adapted to cooperate with said film tension means to operate said film supply carrier means and said film take-up carrier means, and
   means defining a second film path between said film supply carrier means and said film take-up carrier means when said support means is located in operative position in the camera.

2. A film loading and control system adapted to be mounted in a camera as set forth in claim 1 wherein said film tension means comprises:
   a pair of control arms adapted to rotate about a support;
   a roller for contacting the film disposed near a first end of each of said control arms;
   a surface for actuating said control means located at a second end of each of said control arms, and
   spring means attached to said control arms to bias said control arms such that they remain in contact with the film at all times.

3. A film loading and control system adapted to be mounted in a camera as set forth in claim 2 wherein one of said pair of control arms is positioned on one side of the image plane of the camera and the second arm of said pair of control arms is positioned on the opposite side of the image plane from said first control arm.

4. A film loading and control system adapted to be mounted in a camera as set forth in claim 2 wherein one arm of said pair of control arms cooperates with said control means to regulate the movement of said film supply carrier means and the other arm of said pair of control arms cooperates with said control means to regulate the movement of said film take-up carrier means.

5. A film loading and control system adapted to be mounted in a camera as set forth in claim 1 wherein said film tension means cooperates with said film supply and film take-up carrier means to load film for use in the camera as said support means is positioned in the camera.

6. A film loading and control system adapted to be mounted in a camera as set forth in claim 1 wherein said control means includes a contact switch which is activated when said support means is located in operating position in the camera.

7. A film loading and control system adapted to be mounted in a camera as set forth in claim 1 wherein said film advance roller for moving film between said film supply carrier means and film take-up carrier means is disposed on said support means such that it is not in contact with the film in said first film path when said support means is out of the camera but is in contact with the film in said second film path when said support means is mounted in the camera.

8. A film loading and control system adapted to be mounted in camera as set forth in claim 1 wherein said support means is separable from the camera.

9. A film loading and control system adapted to be mounted in a camera as set forth in claim 1 wherein said film supply and film take-up carrier means can be supplied with film while separated from the camera.

10. A transport assembly for loading film into a camera having an image plane comprising:
    a base plate;
    a supply reel mounted on said base plate;
    a take-up reel mounted on said base plate and spaced from said supply reel;
    film guide rollers on said base plate for guiding the film along a first film path between said supply reel and take-up reel when said base plate is not in operative position in the camera;
    a film advance roller mounted on said base plate and not in contact with the film in said first film path, said film advance roller being placed in contact with the film in a second film path when said base plate is mounted in operative position in the camera, being adapted to move the film past the image plane of the camera;

means for establishing said second film path between said supply reel and said take-up reel as said base plate is moved into operative position in the camera;

means for controlling said supply reel and said take-up reel to enable said film to be moved from said first film path into said second film path as said base plate is being placed into operative position in the camera, and means for controlling said supply reel and said take-up reel and said film advance roller to move the film along said second film path past the image plane of the camera.

11. A film transport apparatus for a camera having an image plane comprising:

a support plate, a film supply spindle mounted for rotation on said support plate, a film take-up spindle mounted for rotation on said support plate, a plurality of film transport rollers disposed on said support plate and defining a first film path between said film supply and film take-up spindles, a film advance roller mounted on said plate adjacent to but not in contact with said first film path, a pair of spring biased pivotally mounted film tension arms mounted in the camera and disposed on either side of the image plane, and a second film path between said film supply spindle and said film take-up spindle defined by said film transport rollers, said film tension arms and said film advance roller when said support plate is positioned to supply film across the image plane of the camera.

12. A film transport apparatus as set forth in claim 11 wherein said plurality of film transport rollers comprises an idler roller mounted on said plate and spaced from said film advance roller and at least one film roller disposed on each side of the image plane.

13. A film supply and take-up apparatus for a camera having an image plane comprising:

a spring biased film supply control arm pivotally mounted in the camera and having a roller mounted at one end of said arm and a switch contacting position at the opposite end of said supply control arm;

a spring biased film take-up control arm pivotally mounted in the camera and having a roller mounted at one end of said arm and a switch contacting position at the opposite end of said take-up control arm;

a film supply motor control switch mounted in working relationship with said switch contact position of said film supply control arm;

a film take-up motor control switch mounted in working relationship with said switch contacting position of said film take-up control arm;

a film support plate for mounting in the camera;

a film supply reel holder mounted on said support plate;

a film take-up reel holder mounted on said support plate and spaced from said film supply reel holder;

film guide rollers mounted on said support plate defining a first film path between said film supply reel holder and said film take-up reel holder when said support plate is not in its operating position in the camera, and defining a portion of a second film path when said support plate is mounted in the camera with the film contacting said film supply and film take-up control arms;

an idler roller mounted on said support plate adjacent to said first film path;

a motor driven film advance roller mounted on said support plate adjacent to said first film path and in position to contact the film when the film is displaced from said first film path into said second film path, whereby said film supply control arm and supply motor control switch and said film take-up control arm and take-up motor control switch control the film transport and maintain tension on the film as the motor driven film advance roller moves the film during operation of the camera.

* * * * *